(No Model.)
H. C. SERGEANT.
DRILL CHUCK.
No. 484,118. Patented Oct. 11, 1892.
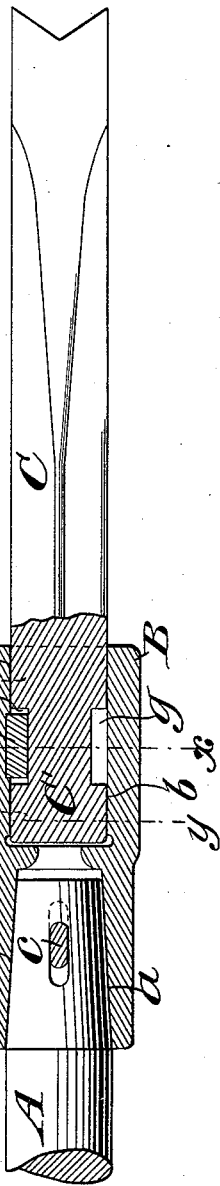
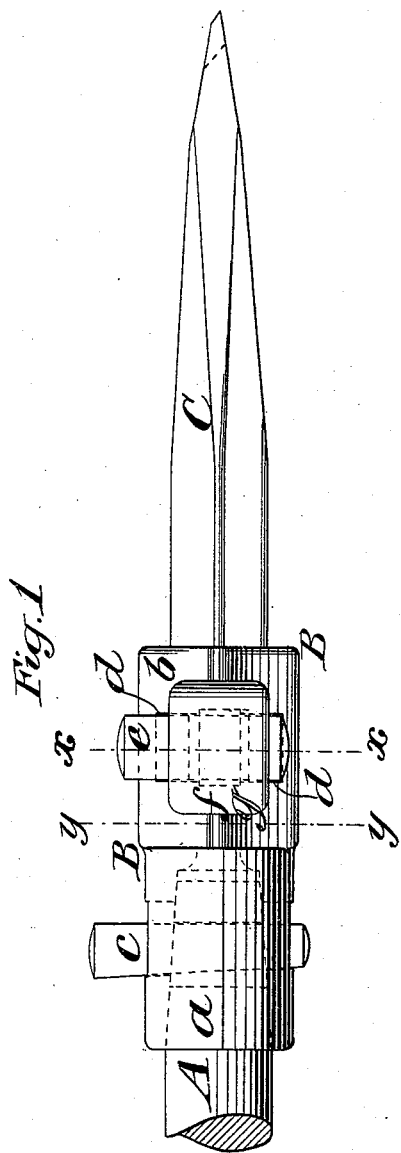
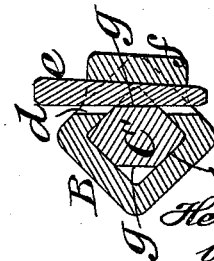
Witnesses:
O. L. Sundgren
Fred. Haynes
Inventor:
Henry C. Sergeant
by attorneys
Brown & Seward

UNITED STATES PATENT OFFICE.

HENRY C. SERGEANT, OF WESTFIELD, NEW JERSEY, ASSIGNOR TO THE INGERSOLL-SERGEANT DRILL COMPANY, OF NEW YORK, N. Y.

DRILL-CHUCK.

SPECIFICATION forming part of Letters Patent No. 484,118, dated October 11, 1892.

Application filed January 26, 1892. Serial No. 419,286. (No model.)

*To all whom it may concern:*

Be it known that I, HENRY C. SERGEANT, of Westfield, in the county of Union and State of New Jersey, have invented a new and useful Improvement in Drill-Chucks, of which the following is a specification.

This invention is more especially designed for the chucks employed in coal-mining machines for holding the drills or, as they are commonly termed, the "picks;" and its object is to provide for making such drills or picks of square forged steel and for retaining the full size of the square of the steel to the end of the shank which enters the socket of the chuck, and by that means to obviate the liability to breakage which is unavoidable with the turned shanks with which such picks have been heretofore made.

I will proceed to describe my invention with reference to the drawings, and afterward point out its novelty in a claim.

Figure 1 represents an outside longitudinal view of part of the piston-rod of a coal-cutting machine, an extension-chuck embodying my invention applied to said piston-rod, and a pick in said chuck. Fig. 2 is a longitudinal view corresponding with Fig. 1 at right angles thereto, partly in section. Fig. 3 represents a transverse section in the line $x\ x$ of Figs. 1 and 2. Fig. 4 represents a transverse section in the line $y\ y$ of Fig. 2.

Similar letters of reference designate corresponding parts in all the figures.

A is the piston-rod, and B the chuck. C is the drill or pick, represented as made of a piece of square forged steel rod, with its shank C' of the full size of the square of the rod. The chuck B is made with two sockets, one at each end. The socket $a$ at one end is tapered to receive the tapered end of the piston-rod, and the socket $b$ at the other end is made square and parallel to receive the square end or shank C' of the drill or pick.

The socket $a$ is represented as secured to the piston-rod by a key $c$; but the method of attaching the chuck to the piston-rod is immaterial to my invention.

The square socket $b$ has cut across one of its angles a keyway $d$ for the reception of the tapered key $e$. The said angle is represented as strengthened externally by a boss $f$. The square shank C' of the pick or drill has also cut in it across two of its angles notches $g\ g$, through which the said key passes, the object of these notches being to make a flat bearing for the key. One of these notches, however, is sufficient for the purpose of my invention; but I prefer to make two to provide for reversing the drill in the chuck.

The square shank of the drill or pick being inserted into the square socket with one of the notches $g$ next the keyway $d$ and the key being inserted through the keyway, the driving in of the key wedges the opposite angle of the drill-shank into the corresponding angle of the socket and secures the drill or pick within the socket more firmly than it is possible to secure a round shank in a round socket, while, owing to the full size of the square steel being retained in the shank, there is no liability of that part of the drill or pick to break.

What I claim as my invention, and desire to secure by Letters Patent, is—

The combination, with the chuck having a square socket for the reception of the square shank of a drill or pick and having a keyway across one of its angles, of a taper key inserted in said keyway to wedge one of the angles of the shank into the corresponding angle of the socket, substantially as herein set forth.

HENRY C. SERGEANT.

Witnesses:
FREDK. HAYNES,
GEORGE BARRY.